United States Patent [19]

Donnelly et al.

[11] 4,053,399
[45] Oct. 11, 1977

[54] METHOD AND SYSTEM FOR WASTE TREATMENT

[75] Inventors: Lawrence A. Donnelly, Centerport; Leland C. Flocke, Elnora; Victor H. Himel, Port Washington; John J. Mikals; Alfred E. Munier, both of Huntington; Lawrence Slote, Great Neck, all of N.Y.

[73] Assignee: Grumman Aerospace Corporation, Bethpage, N.Y.

[21] Appl. No.: 573,130

[22] Filed: Apr. 30, 1975

[51] Int. Cl.[2] ............................ C02C 5/06; C02B 1/38
[52] U.S. Cl. ................................... 210/44; 210/63 Z; 210/73 S; 210/151; 210/152; 210/195 R; 210/221 P
[58] Field of Search ............... 210/44, 63 R, 63 Z, 210/67, 71, 73 S, 152, 195 R, 195 S, 221 P, 150, 151

[56] References Cited

U.S. PATENT DOCUMENTS

| 782,021 | 2/1905 | Friberg | 210/63 |
|---|---|---|---|
| 3,276,994 | 10/1966 | Andrews | 210/8 |
| 3,523,891 | 8/1970 | Mehl | 210/44 |
| 3,622,508 | 11/1971 | Komline | 210/67 |
| 3,658,590 | 2/1972 | Roberts et al. | 110/7 |
| 3,732,163 | 5/1973 | Lapidot | 210/63 Z |

*Primary Examiner*—Thomas G. Wyse
*Attorney, Agent, or Firm*—Morgan, Finnegan, Pine, Foley & Lee

[57] ABSTRACT

A method for waste treatment including the steps of and the associated apparatus for removing large solid waste from the influent raw sewage, transmitting the large solid waste to an incinerator, subjecting the resultant liquor to centrifuging to separate additional suspended solids therefrom, passing the additional suspended solids to the incinerator, subjecting the remaining clarified liquid to ozonation to entrap and bubble out remaining solids, to oxidize residual organic contaminants in the liquid, and to disinfect the liquid, and transmitting the solids to the incinerator. The effluent liquid resulting from ozonation can be recycled or discharged into a suitable receptacle, or it may be treated further by activated charcoal and/or reverse osmosis or similar tertiary treatment technique before recycling or discharging.

20 Claims, 4 Drawing Figures

METHOD AND SYSTEM FOR WASTE TREATMENT

The invention described herein was made in the course of or under a contract, or a sub-contract thereunder, with the Department of Transportation.

BACKGROUND OF THE INVENTION

This invention relates to a method and system for treating raw sewage and more particularly to a method and system for treating raw sewage on marine vessels or on mobile land units from such sources as showers, lavatories, kitchens, or, in the case of shipboard applications, the galley, head, laundry, sanitary system and deck drains below water level. Sewage-containing liquid treated in accordance with this invention is rendered suitable for recycling through the various systems from which it came or discharging into streams, lakes or other receptacles. The present invention can be adapted for use in marine vessels, mobile land units, or land base units where space, and therefore compactness, is a significant consideration.

Raw sewage generally consists of both solid waste matter and organic solids dissolved and suspended in liquid. This sewage is high in BOD (Biological Oxygen Demand), coliform bacteria and other potential ecological pollutants. It has been and remains common practice simply to discharge untreated waste and sewage directly into streams, rivers, lakes, etc.

Recently, concern over increasing environmental pollution, especially in navigable waterways and lakes, has led to the enactment of pollution control laws prohibiting the discharge of raw sewage from marine vessels and establishing maximum levels for ecological pollutants in sewage which may be discharged. In addition, it is anticipated that eventually ocean or foreign port dumping of untreated sewage from holding tanks will also be prohibited.

One alternative to direct discharge of sewage is storage of the waste fluids until proper disposal means can be effected. However, this approach is inconvenient and impractical, especially for units which produce great quantities of waste and/or remain far from disposal facilities for extended periods of time.

Another alternative to direct discharge is chemical treatment of the sewage. However, there are obvious chemical storage and supply problems particularly in the case of large vessels remaining at sea for extended lengths of time where large quantities of chemicals are necessitated. In addition, there is danger that the chemicals may not be thoroughly effective without the assistance of comminuting or other ancillary apparatus.

Many current shipboard waste treatment systems employ physical comminution devices and/or chemical additives, such as in U.S. Pat. No. 3,638,590 to Roberts et al., U.S. Pat. No. 3,395,799 to Kurtz, and U.S. Pat. No. 3,401,115 to Meyer et al. Several problems arise in conjunction with such systems. The macerating or pulping step requires additional equipment, subject to failure or malfunction, which may result in shut down of the entire sewage treatment system. Furthermore, this additional equipment requires maintenance and occupies valuable space. In operation, the comminutor often requires ancillary apparatus in the nature of a coagulant means or supplementary fluid means for maintaining a proper influent consistency. Those requiring chemical treatment are not desirable due to costs and storage problems. Furthermore, many chemicals used to treat waste are pollutants themselves.

Other waste treatment systems such as U.S. Pat. No. 3,625,883 to Valdespino, U.S. Pat. No. 3,276,794 to Andrews, U.S. Pat. No. 3,549,592 to Wiseman, and U.S. Pat. No. 3,487,923 to Visman are undesirable for shipboard or mobile land unit applications because they involve elaborate schemes of storage tanks, intermediate tanks and lagooning tanks which not only occupy substantial space but also require extended periods of time to effect thorough treatment.

SUMMARY OF THE INVENTION

It is therefore an object of the present invention to provide an efficient shipboard waste treatment system characterized by compactness, ease of maintenance and the absence of comminutors or stored chemical additives.

It is a further object of the present invention to receive and treat influent waste fluids having approximately 500 mg/l of suspended solids, approximately 500 mg/l of BOD and the normal concentrations of coliform organisms found in shipboard sewage, in either fresh, salt or brackish waters and produce an effluent having, at most, about 50 mg/l of suspended solids, about 50 mg/l of BOD and about 240/100 ml of total coliform.

It is still a further object of the present invention to provide a waste treatment system, for use aboard marine vessels or on mobile land units, which produces an effluent capable of being recycled through sanitary and other systems or discharged without disturbing the ecological balance.

It is an additional object of the present invention to provide a waste treatment system which is capable of substantially complete destruction of pathogenic bacteria and saprophytes and inactivation of viruses.

It is yet another object of the present invention to provide a waste treatment system which operates independent of ancillary treatment facilities.

According to the present invention, suspended solids and BOD are removed from influent raw sewage as follows:
 a. large foreign objects and large particulate matter are separated by using an inclined screen;
 b. medium size, suspended bio-waste solids that penetrate the screen are removed by centrifugation;
 c. fine, colloidal, and dissolved solids are removed or rendered non-polluting by ozonation.

The removed solids at each of these stages are incinerated to a minute quantity of sterile, inert ash. During ozonation, the waste water is disinfected, reducing coliform count to low levels. It is well known in the art that ozone will destroy pathogenic bacteria and saprophytes and inactivate viruses such as poliomyelitis and entero viruses.

Apparatus designed according to the present invention is simple to operate and requires only routine maintenance. It can be started or stopped on demand, and once started, it automatically processes the waste without odor, leaving only a small quantity of inert ashes for manual periodic removal. No chemical additives are required, thereby eliminating associated handling and storage problems. The system is lightweight and compact and can be readily installed aboard a ship or mobile land unit, either a prepackaged unit or custom fitted into available spaces. Furthermore, systems designed in accordance with the present invention will easily satisfy current proposed Environmental Protection Agency standards in a compact system which can be adapted to various capacities.

The waste treatment system in accordance with the present invention may be adapted for gravity assistance to simplify its equipment and mechanics. Furthermore, tertiary treatment devices such as an activated carbon column, reverse osmosis or ultrafiltration units can be added to improve the quality and clarity of the effluent.

These and other objects, features and advantages of the present invention will become more apparent when the detailed description of the preferred embodiments is considered in light of the drawings in which.

DESCRIPTION OF THE PREFERRED EMBODIMENTS

Figure 1:
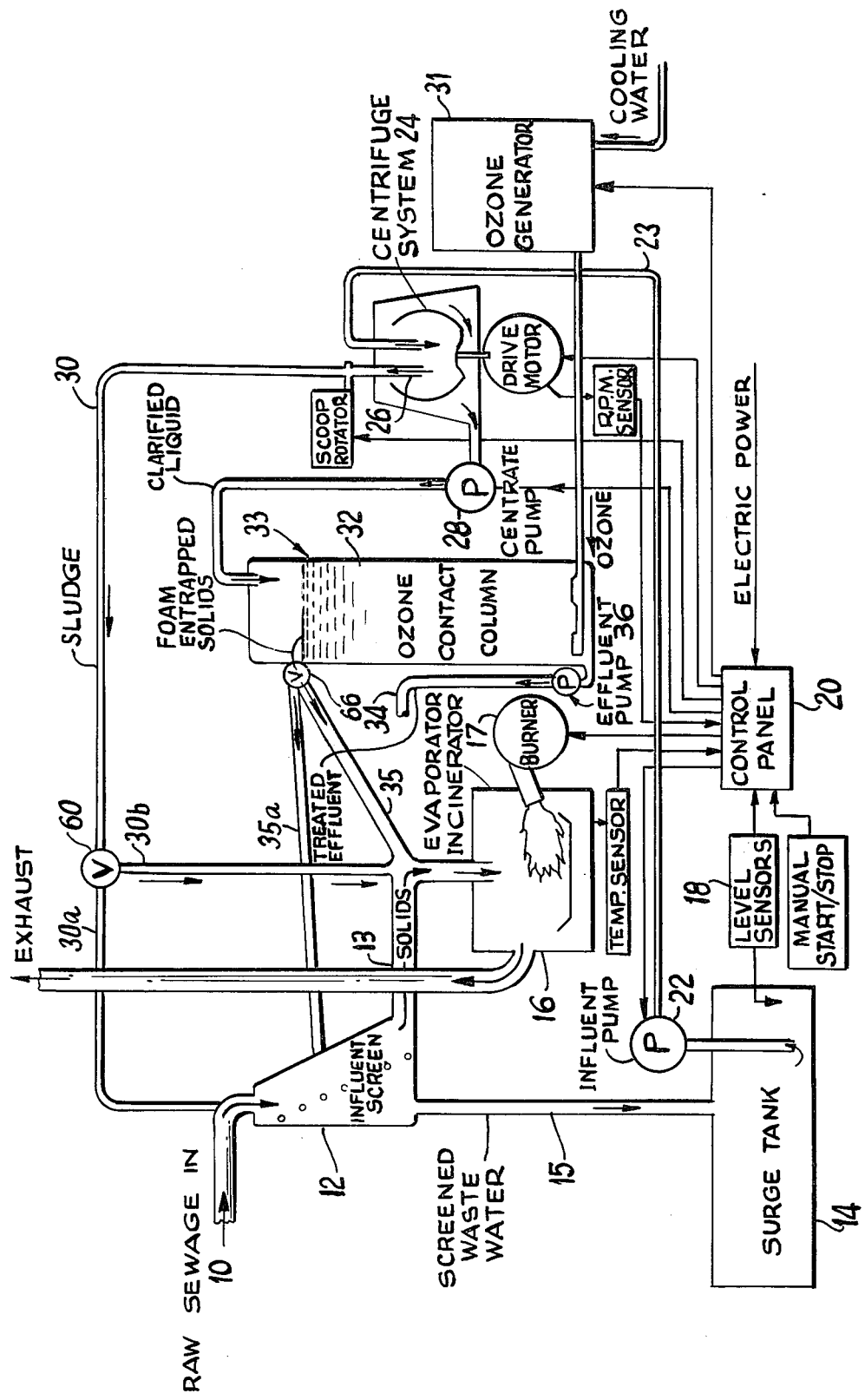
FIG. 1 is a schematic of a waste treatment system according to the present invention having one centrifuge.

Referring to FIG. 1, there is shown a system for carrying out the present invention according to one of its embodiments. Raw sewage is fed into the waste treatment system at inlet 10 and directed to influent screen means 12 which initially separates large foreign bodies and heavy solid waste matter from the waste fluid in the influent stream. Advantageously, the screen is a one-piece stainless steel mesh of heavy puncture-proof wires featuring an incline or downward curve to provide a screen which is self-cleaning and non-clogging. A particularly useful influent screen is sold under the trade name "Hydraseive." The entire flow is gravity operated and separation is actually enhanced by the motions of the vessel or vehicle, rendering the screen self-cleaning to permit continuous operation for extended periods without attention.

The solids separated from the influent are directed from influent screen means 12 to evaporator/incinerator 16. Advantageously, these solids and foreign bodies are gravity fed through conduit 13 to evaporator/incinerator 16 where they are incinerated to a minute quantity of sterile inert ash.

Evaporator/incinerator 16 operates completely automatically to accept heavy waste matter and foreign bodies from the influent screen, and, as described below, the centrifuge(s) and the ozonator system. The evaporator/incinerator is fabricated from specially selected corrosion-resistant material designed to provide long life in a high-temperature salt or fresh water environment under thermal shock conditions. The combustion chamber is fully insulated by a stable, high strength, ceramic fiber insulation blanket which provides maximum thermal efficiency, safety and economy. A commercial oil burner 17 provides the heating; the high temperatures achieved in the vapors and gases insures odorless and smokeless operation. Oil burner operation is controlled by thermal switches which insure that all waste is destroyed and that temperatures stay within safe limits. Advantageously, the evaporator/incinerator may be either a single chamber pyrolitic incinerator or a spray injection atomizing incinerator.

Following initial separation, the resultant screened waste fluid is conducted from the influent screen to surge tank 14. This may be conveniently accomplished by simple gravity feed through conduit 15. The surge tank acts as a holding tank or reservoir providing retention capacity to maintain flow through the remainder of the system at a substantially constant rate regardless of influent flow at inlet 10.

Level sensor 18 in surge tank 14 activates influent pump 22 via control panel 20 to feed the screened waste fluid through conduit 23 from the surge tank to centrifuge system 24. The centrifuge system separates suspended solids from the screened fluid to leave clarified liquid. According to one aspect of the present invention, centrifuge system 24 comprises a single centrifuge. A particularly useful centrifuge is an imperforate basket centrifuge. This centrifuge may be a substantially moderate g, continuous-liquid-flow clarifier developing about 1400 g's at the overflow level and about 2100 g's for compaction at approximately 3600 revolutions per minute.

In operation, heavy particles in the liquid are thrown out of suspension and collect within the bowl as sludge. Clear liquid flows over the edge of the bowl and is discharged to centrate pump 28 which transfers it to an ozone reactor system. Sludge clean-out is accomplished by scoop means 26 inserted into the spinning basket to force-feed the sludge to evaporator/incinerator 16 through conduit 30. Advantageously, discharge from scoop 26 may be first directed to influent screen 12. This may be accomplished by providing valve 60 on conduit 30 to direct the flow of discharge through conduit 30a, thereby cutting off access to conduit 30b, or simply by eliminating conduit 30b and providing one continuous conduit comprising sections 30 and 30a leading to influent screen means 12.

Initially passing the sludge resulting from centrifuging directly to influent screen means 12 is particularly useful due to initial surge of water through scoop 26 attributable to water remaining in centrifuge system 24. The residual water is thereby prevented from entering incinerator 16, eliminating chances for corrosion therein. This is particularly advantageous in waste treatment systems operating with or in salt water where corrosion in the evaporator/incinerator can be a critical problem. Accordingly, solids which have been partially compacted by the centrifuge roll down influent screen 12 after which they are fed to evaporator/incinerator 16 as described above. Liquid accompanying this sludge passes through the screen and is reintroduced to the system along with the screened waste fluid.

Clarified liquid leaving the centrifuge system is fed to ozonator system 33. This may be accomplished by means of centrate pump 28 or it may be accomplished in a mechanically simple fashion by positioning centrifuge 24 above the ozonator system in order that clarified liquid may flow into ozonator system 33 via gravity attraction. With the latter arrangement, centrate pump 28 is eliminated.

Ozonator system 33 consists of two basic units, ozone generator 31 and ozone reactor tank or contact column 32. Preferably, the ozone generator employs the corona discharge (silent arc) principle of ozone generation and supplies ozone or an ozone/air mixture (hereinafter referred to simply as ozone) to contact column 32. The ozone contact functions as a holding and mixing tank to retain the clarified liquid for reaction with ozone. Ozone, renown for its purifying properties, reacts with small solids and other pollutants in the liquid to produce a substantially disinfected effluent.

Advantageously, ozone reactor tank 32 comprises at least one tall cylinder filled with clarified liquid introduced substantially near its top. Ozone is introduced through diffusers positioned near the base of the column so that the ozone bubbles up through the column and entraps small solids and pollutants with which it comes in contact. These entrapped solids and pollutants, i.e., those that either are engulfed within the bubbles or adhere to the surface of the bubbles, are carried to the surface. Space is provided at the top of the contact column 32 to allow the entrapped elements to form a foam which is capable of easy disposal into evaporator-/incinerator 16 through conduit 35.

As discussed above with reference to sludge clean-out of centrifuge system 24, the foam may be initially transmitted to influent screen means 12 before passage to evaporator/incinerator 16. This may be accomplished by orienting valve 66 such that the foam flows through conduit 35a into influent screen means 12. Alternatively, conduit 35 may be deleted altogether so that foam travels only through conduit 35a, thus eliminating need for valve 66. Since the foam will not be heavily laden with liquid, it need not be acted upon by the entire influent screen. Therefore, conduit 35a need not introduce the foam at the top of influent screen means 12. Advantageously, conduit 35a may be connected to influent screen 12 at any convenient point on its housing such that conduit 35a has a downward slope to provide gravity feed of the foam into influent screen means 12.

Figure 3A:
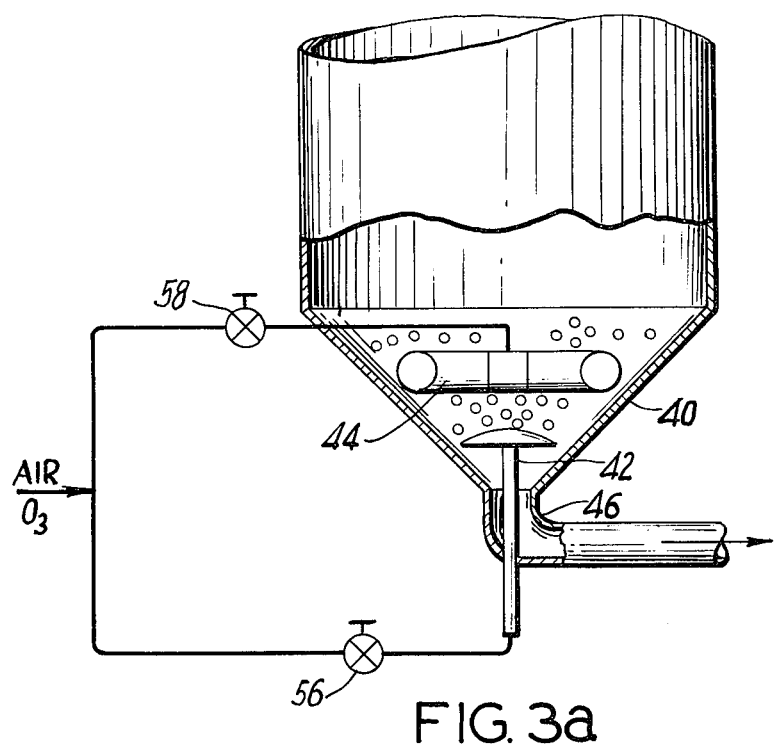
FIGS. 3a and 3b are side elevational views, with parts broken away for clarity, of diffusers used in the present invention.

Advantageously, the bottom of the ozone contact column may be formed with cone 40 (FIG. 3a) and a diffuser positioned substantially at its cusp to enhance diffusion of ozone throughout the column and prevent static build-up of solids where the ozone could not otherwise reach. In a particularly useful embodiment, the diffuser may be either a stainless steel mushroom diffuser 42 or a teflon o-ring diffuser 44 or both. Flow through diffuser 42 or diffuser 44, or both, can be regulated by any convenient means such as valves 56 and 58, respectively, while disinfected effluent can be withdrawn through drain port 46 at cusp of the cone.

Figure 3B:
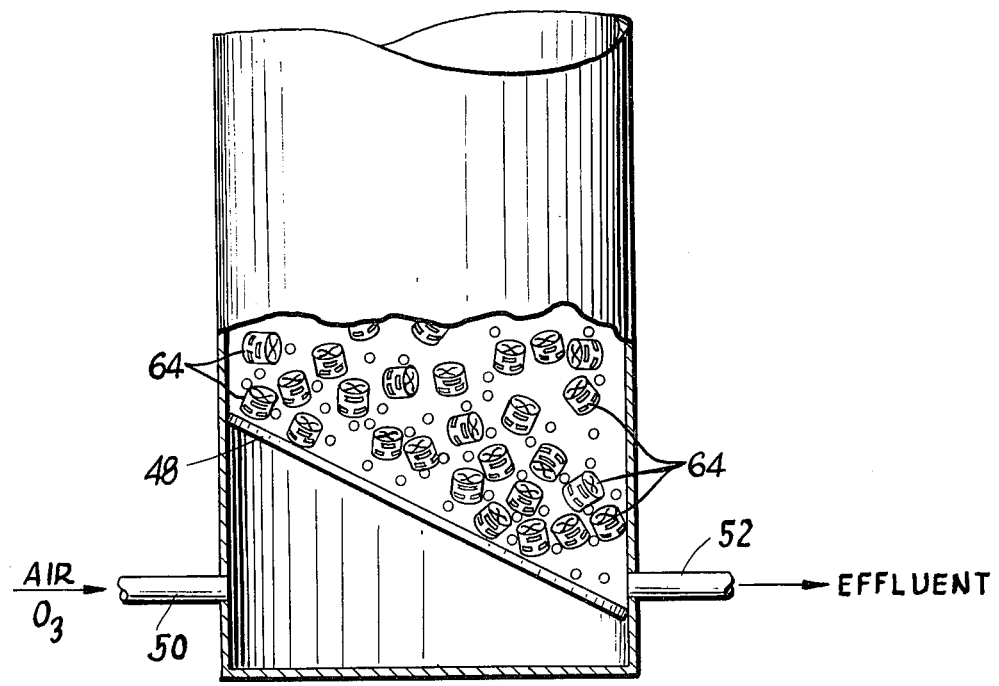

In another useful embodiment, contact column 32 may be a closed-bottom cylinder having a slanted stainless steel disc diffuser 48 near its bottom as shown in FIG. 3b. The ozone is forced into the bottom at inlet 50 and bubbled through diffuser 48, thereby effecting total diffusion and preventing static build-up of solids. Disinfected effluent can be withdrawn through drain port means 52 near the lowest point of diffuser 48.

In still another useful embodiment, ozone reaction column 32 may be packed with packing means 64 in the form of Pall Rings, Berl Saddles or other suitable packings to enhance the performance of the ozone reactor column and generate a clearer effluent. The clarifying effect of the packings has been attributed to the fact that these elements further diffuse the ozone bubbles, dividing them into smaller ones, and provide a surface area to accommodate the reaction of ozone with fine and colloidal solids in the liquid. The packings 64 should not be too large as the ozonation process may be adversely affected since the ozone bubbles may cling to their surfaces and coalesce into larger bubbles which are less effective for entrapping solids and disinfecting the mixture.

Figure 2:
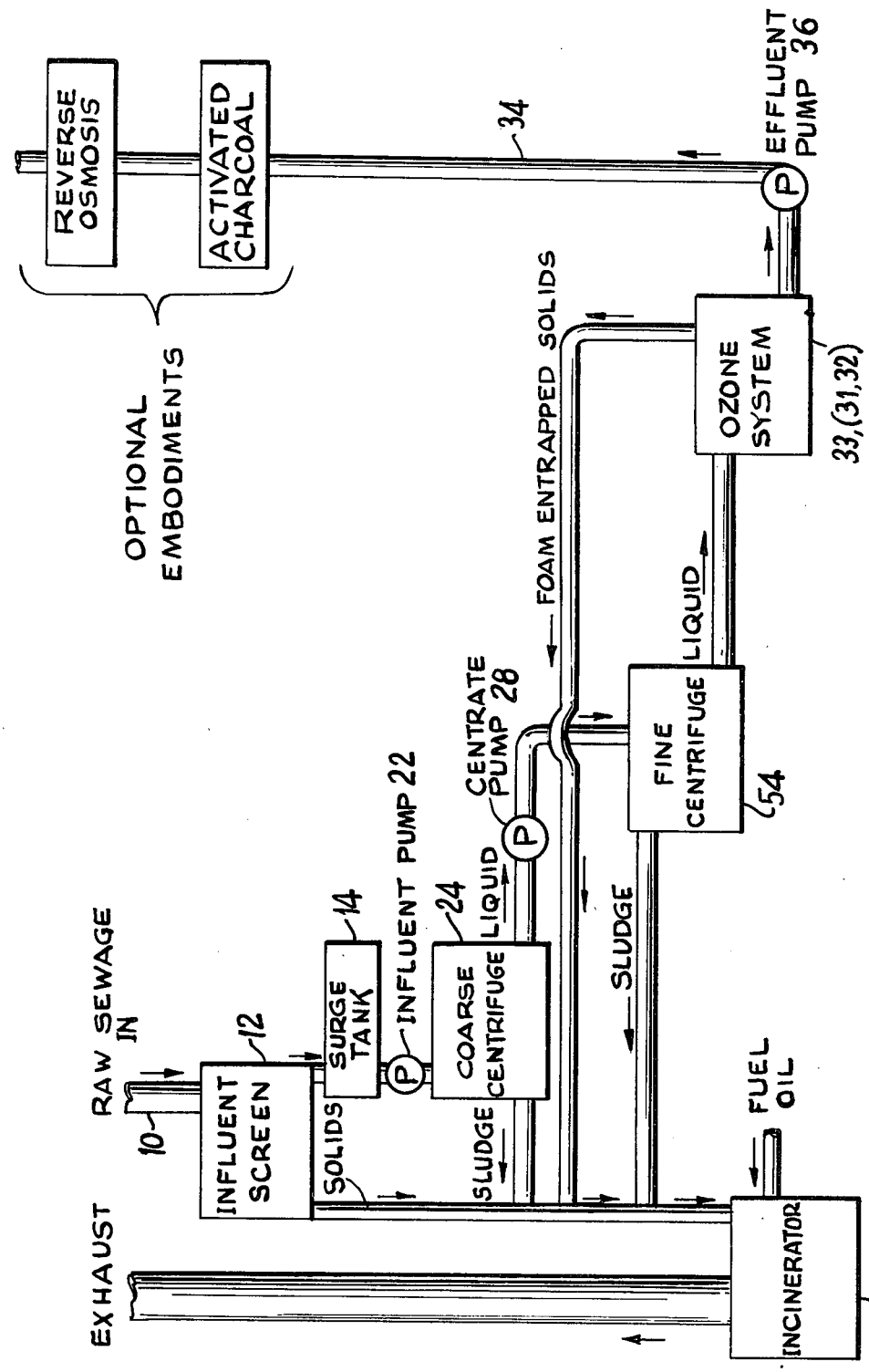
FIG. 2 is a schematic of a waste treatment system according to the present invention having two centrifuges.

According to another aspect of the present invention, shown in FIG. 2, the waste treatment system includes second centrifuge means 54 positioned after first centrifuge means 24. Clarified liquid leaving centrifuge 24 is fed to centrifuge 54 by centrate pump 28. Centrifuge 54 can be a substantially high-g fine particle centrifuge such as a disk or scroll centrifuge for removal of fine suspended particles to ensure proper suspended solid counts in the effluent. When a scroll centrifuge is used, sludge clean-out is simple since these devices are inherently self-cleaning. Where a disk centrifuge is employed, sludge clean-out can be simply accomplished by connecting hydraulic pressure means to the centrifuge casing and forcing sludge through an outlet in the casing from which the sludge may be passed to screen 12 for removal of excess water before passing to incinerator 16. The further clarified liquid from second centrifuge means 54 is directed to ozonator system 33 either by a second centrate pump 28 or via simple gravity feed resulting from the arrangement of equipment as described above with reference to the one centrifuge system.

The quality and clarity of the effluent may be further enhanced by subjecting the treated effluent from the ozonator to tertiary treatment as shown in FIG. 2. Means for accomplishing tertiary treatment may be in the form of activated charcoal or carbon, reverse osmosis, ultrafiltration or other suitable tertiary treatment systems. Furthermore, these devices may be combined in series to produce an effluent having the desired particulate concentrations.

The system according to the present invention may be automatically operated and governed by a control console comprising a completely integrated, functional arrangement of controls, indicators and safety devices, providing rapid push-button startup/shutdown. Visual displays for status monitoring and fault isolation can be provided, as well as individual push buttons to permit independent startup and shutdown of components for fault isolation and checkout. Automatic controls can be adjusted by the operator to provide optimum performance and economy.

The primary control functions are:
i. System startup;
ii. Centrifuge sludge removal;
iii. Evaporator/incinerator burner operation;
iv. System failure alarm and shutdown.

A pushbutton starts the basket centrifuge and ozone generator and initiates the surge tank pump-out and evaporator/incinerator burner cycles. Surge tank pump-out is controlled by high and low level switches. The surge tank pump-out rate corresponds to the system design flow rate.

The sludge removal from the centrifuge(s) is completely automatic. The clean-out of the basket centrifuge can be initiated by an adjustable timer set at a controlled periodic rate. At the start of the clean-out cycle, the surge tank pump may be shut off to stop the flow of sewage into the centrifuge(s). After clean-out, the surge tank pump is reactivated. The clean-out cycle takes less than 20 seconds. Clean-out of a disk centrifuge is performed hydraulically while scroll centrifuges are inherently self-cleaning.

The evaporator/incinerator is started by an adjustable timer at a controlled periodic rate. An incinerator pan thermal switch is used to shut down the burner when the sludge has been reduced to ashes. A high temperature thermal switch cycles the oil burner to prevent overheating of the combustion chamber.

The system master alarm, including indicator lights and a horn, will alert the operator of a failure and automatically shut down the failed component. The alarm is initiated by:
  i. A failure (open circuit breaker) in the control alarm circuit;
  ii. Loss of flow or overfull condition in the surge tank;
  iii. Reduction in speed of basket centrifuge;
  iv. Loss of air pressure, overheating in ozone generator;
  v. Oil burner misfire or flame out.

Individual warning lights and circuit breakers are provided to facilitate troubleshooting. The control system requires a minimum number of operator control manipulations and provides indicator visibility under ambient illumination. Acceptable indicator symbols have been emphasized in the presentation of operational information.

Normal operation of this system is completely automatic and requires no maintenance except for periodic ash removal. The ash is sterile, odorless and lightweight making its removal an unobjectionable task.

It should be understood by those skilled in the art that the above-described embodiments are merely illustrative and that various modifications can be made without departing from the scope and spirit of the invention as defined in the appended claims.

What is claimed is:

1. A method for treating raw sewage comprising the steps of:
  a. screening influent sewage to divide the influent sewage into solid waste matter and screened waste fluid;
  b. incinerating the solid waste matter;
  c. centrifuging the screened waste fluid to divide the screened waste fluid into sludge and clarified liquid;
  d. incinerating the sludge;
  e. passing ozone bubbles through the clarified liquid to divide the clarified liquid into foam entrapped solids, solids adhering to ozone bubbles, and disinfected liquid;
  f. incinerating the foam entrapped solids and solids adhering to ozone bubbles; and
  g. removing the disinfected liquid.

2. A method for treating raw sewage according to claim 1 wherein centrifuging of step (c) comprises initial coarse centrifuging and subsequent fine centrifuging.

3. A method for treating raw sewage according to claim 1 which further comprises subjecting the disinfected liquid to tertiary purification.

4. A method according to claim 1 which further includes the step of screening the sludge resulting from said centrifuging step to remove excess fluid from the sludge prior to incinerating the sludge.

5. A method according to claim 4 which further includes the step of screening the foam entrapped solids to remove excess liquid therefrom prior to incinerating the foam entrapped solids.

6. A waste treatment system suitable for use aboard marine vessels and in mobile land vehicles comprising:
  influent screen means adapted to receive influent sewage from a source of sewage, said influent screen means adapted to separate influent sewage into solid waste matter and screened waste liquid;
  an evaporator/incinerator including burner means adapted for incinerating the solid waste matter;
  means for transferring the solid waste matter from said influent screen means to said evaporator/incinerator;
  receiving means for receiving screened waste liquid from said influent screen means;
  means for transferring waste liquid from said screen means to said receiving means;
  centrifuge means adapted to separate sludge from clarified liquid in the screened waste liquid;
  means for transferring the screened waste liquid from said receiving means to said centrifuge means;
  means for withdrawing the sludge from said centrifuge means and passing said sludge to the evaporator/incinerator;
  ozonator means for receiving the clarified liquid, said ozonator source generally adapted to disinfect said clarified liquid and to remove a substantial portion of suspended solids from the clarified liquid, said ozonator means including:
    a source of ozone,
    at least one reactor column adapted to receive the clarified liquid for reaction with the ozone,
    diffuser means in each reactor column for introducing and evenly dispersing ozone bubbles within the clarified liquid to provide gas-to-liquid contact, and
    means for supplying ozone from said ozone source to said diffuser means;
  means for transferring clarified liquid from said centrifuge means to each of said reactor columns;
  means for removing the removed solids contained generally in a foam formed on the surface of clarified liquid in each reactor column and for passing the solids to said evaporator/incinerator; and
  means for withdrawing the remaining disinfected liquid from said ozonator means.

7. A waste treatment system according to claim 6 wherein said receiving means comprises a surge tank generally adapted to retain screened waste fluid.

8. A waste treatment system according to claim 7 wherein said means for transferring the solid waste matter from said influent screen means to said evaporator/incinerator comprises conduit means therebetween adapted to allow transfer of the solid waste to said evaporator/incinerator generally by gravity flow thereof, and wherein said means for transferring waste liquid from said influent screen means to said surge tank comprises conduit means therebetween adapted to allow transfer of the screened waste liquid to said surge tank generally by gravity flow thereof.

9. A waste treatment system according to claim 7 wherein said means for withdrawing sludge from said centrifuge means further includes means for passing said sludge to said influent screen means to remove excess fluid from said sludge before passage of said sludge to said evaporator/incinerator.

10. A waste treatment system according to claim 7 wherein said means for withdrawing foam from said ozonator means further includes means for passing said foam to said influent screen means to remove excess liquid from said foam before passage of said solids to said evaporator/incinerator.

11. A waste treatment system according to claim 10 wherein said means for passing the foam to said influent screen is adapted to pass the foam substantially by gravity flow, such that the foam is introduced at a point on said influent screen generally below the top thereof.

12. A waste treatment system according to claim 7 which further comprises:
  means for starting the centrifuge means and ozonator means, and automatically initiating surge tank pump-out and evaporator/incinerator burning cycles;

sensing and timing means for initiating sludge clean-out of the centrifuge means;

timing means for starting the evaporator/incinerator;

high temperature thermal switching means to cycle the burner means to prevent overheating in said evaporator/incinerator;

incinerator pan thermal switch means for shutting off said burner means when sludge has been reduced to ashes;

master alarm means for alerting an operator of failure in said system; and control means for controlling all of said starting means, said sensing and timing means, said timing means, said switching means and said switch means from an essentially single location.

13. A waste treatment system according to claim 7 wherein said centrifuge means comprises a coarse centrifuge, means for withdrawing sludge separated out by said coarse centrifuge and passing said sludge to said evaporator/incinerator, a fine centrifuge in flow communication with said coarse centrifuge for receiving clarified liquid from said coarse centrifuge to separate out additional sludge and produce further clarified liquid.

14. A waste treatment system according to claim 7 wherein said reactor column is formed with a substantially cone-shaped bottom and said diffuser means comprises a stainless steel mushroom diffuser positioned within said cone substantially near its cusp and said means for withdrawing the disinfected liquid is at said cusp.

15. A waste treatment system according to claim 14 which further includes means for packing said reactor column to improve quality of effluent.

16. A waste treatment system according to claim 7 wherein said reactor column is formed with a substantially cone-shaped bottom and said diffuser means comprises a Teflon O-ring diffuser positioned within said cone substantially near its cusp and said means for withdrawing the disinfected liquid is at said cusp.

17. A waste treatment system according to claim 16 which further includes means for packing said reactor column to improve quality of effluent.

18. A waste treatment system according to claim 7 wherein said diffuser comprises a stainless steel disc diffuser positioned at an angle in said reactor column substantially near its bottom, and said means for withdrawing disinfected liquid from said reactor column comprises an outlet at the bottom of said reactor column slightly above said disc diffuser at its lowest point.

19. A waste treatment system according to claim 18 which further includes means for packing said reactor column to improve quality of effluent.

20. A waste treatment system according to claim 7 which further includes at least one tertiary treatment device for additionally treating said disinfected liquid.

* * * * *